United States Patent [19]

Courson

[11] 4,298,297

[45] Nov. 3, 1981

[54] LOCK NUT

[75] Inventor: Richard B. Courson, Grosse Pointe Park, Mich.

[73] Assignee: Almo Manifold and Tool Company, Centerline, Mich.

[21] Appl. No.: 64,376

[22] Filed: Aug. 7, 1979

[51] Int. Cl.³ .............................................. F16B 37/12
[52] U.S. Cl. ................................. 411/262; 10/86 A; 411/438; 411/262;438
[58] Field of Search ................. 151/14 CS; 85/32 CS, 85/64; 10/86 A, 86 R

[56] References Cited

U.S. PATENT DOCUMENTS

| | | | |
|---|---|---|---|
| 1,189,081 | 6/1916 | Fitzgerald | 85/32 CS X |
| 2,022,946 | 12/1935 | Staempfli | 85/32 CS X |
| 2,210,353 | 8/1940 | Barnes | 85/32 CS X |
| 2,387,257 | 10/1945 | Haas | 151/14 CS X |
| 2,575,731 | 11/1951 | Santa | 85/32 CS X |

FOREIGN PATENT DOCUMENTS 900672  7/1962  United Kingdom ........... 151/14 CS

*Primary Examiner*—Ramon S. Britts
*Attorney, Agent, or Firm*—William L. Fisher

[57] ABSTRACT

Improvement in a lock fastener comprising a length of compression spring and a housing therefor permanently fastened to a rear portion of the spring, the turns on the front portion of the spring being free for threadably engaging an externally threaded fastener of the same hand as the helix of the spring, the front end of the spring being closed and ground so that upon rotation of the housing, the front end of the spring will threadably engage the externally threaded fastener, whereby to form a lock joint between the latter and the lock fastener.

14 Claims, 9 Drawing Figures

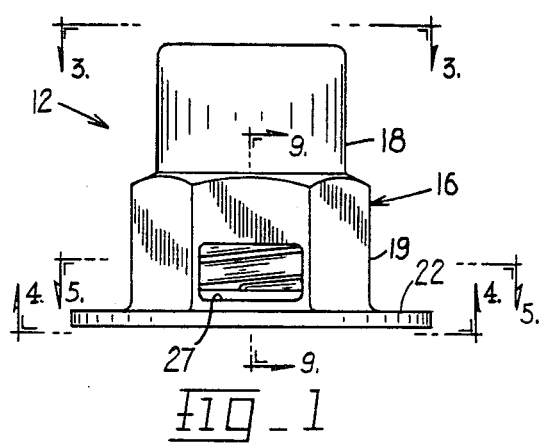
FIG_1
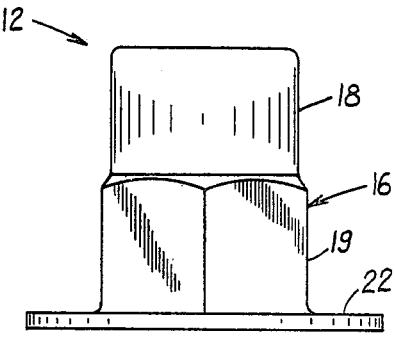
FIG_2
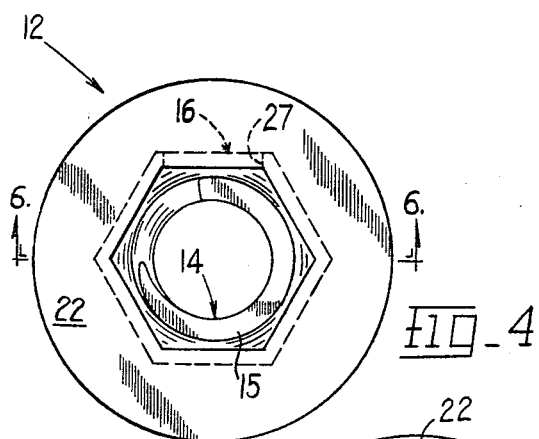
FIG_4
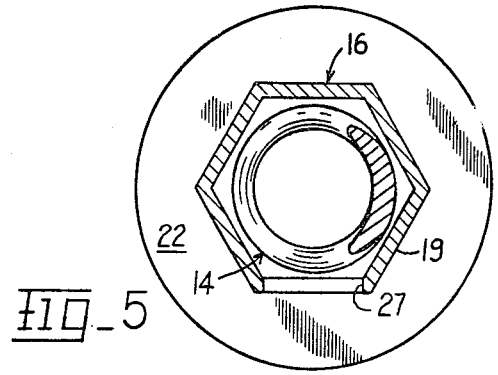
FIG_5
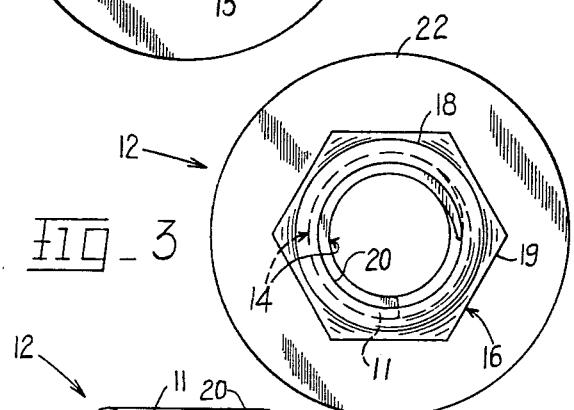
FIG_3
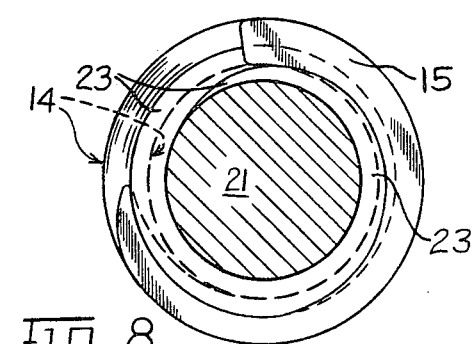
FIG_8
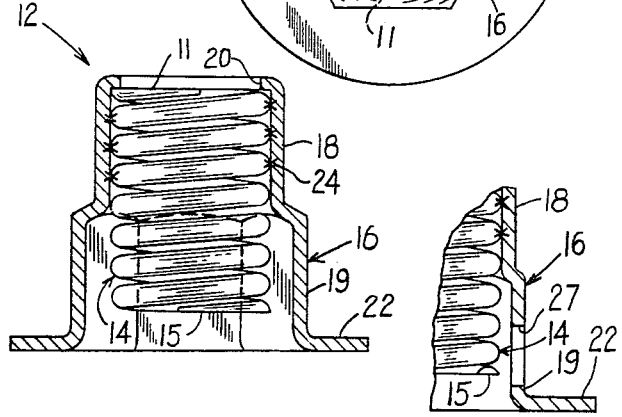
FIG_6
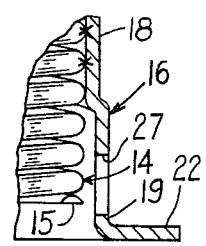
FIG_9
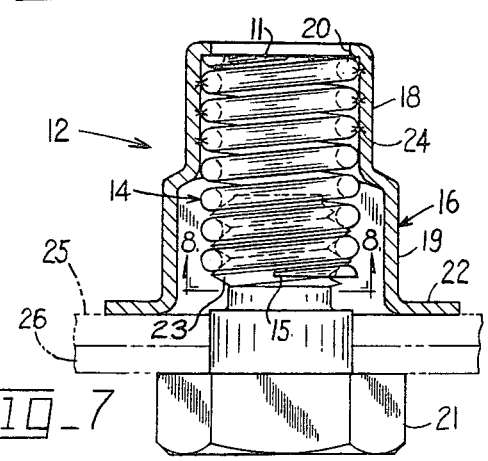
FIG_7

LOCK NUT

My invention relates to lock fasteners.

Many presently available lock fasteners are expensive, e.g. they must be pierced and require piercing of the bolt in order to insert a cotter pin to hold the fastener in place. Many are inconvenient to use and are not reliable, e.g. they depend upon lock washers, either separable or integral, for their locking action but even then they work loose from vibration or other causes. Oftentimes fasteners are locked in place by requiring the user to peen the shank end of the bolt which is not satisfactory in many cases.

I have invented a lock fastener which overcomes the foregoing disadvantages; accordingly, the principal object of my invention is the provision of improvements in a lock fastener which make it inexpensive to manufacture, extraordinarily effective and reliable in locking, easy to use, does not require lock washers, and, when once applied, remains locked in place and will not loosen from vibration or other causes.

The foregoing object of my invention and the advantages thereof will become apparent during the course of the following description, taken in conjunction with the accompanying drawings, in which:

FIGS. 1 and 2 are respective elevational views of a lock fastener embodying my invention;

FIGS. 3 and 4 are top and bottom plan views of the structure of FIG. 1 taken, respectively, on the lines 3—3 and 4—4 thereof;

FIG. 5 is a horizontal sectional view of the structure of FIG. 1 taken on the line 5—5 thereof;

FIG. 6 is a sectional view of the structure of FIG. 4 taken on the line 6—6 thereof;

FIG. 7 is a view similar to FIG. 6 showing said embodiment in use with an externally threaded fastener;

FIG. 8 is an enlarged horizontal sectional view of the structure of FIG. 7 taken on the line 8—8 thereof; and FIG. 9 is a fragmentary vertical sectional view of the structure of FIG. 1 taken on the line 9—9 thereof.

Referring to the drawings in greater detail, 12 generally designates said lock fastener which comprises a compression spring 14 having a right hand helix, in the instance shown, and a housing 16 therefor permanently fastened to and surrounding said spring 14. Said housing 16 extends beyond the length of said spring 14. In the instance, a rear portion 18 of said housing 16 is cylindrically shaped and has an inside diameter which conforms to the outside diameter of said spring 14. The turns on a corresponding length of the spring 14 are captured in said rear housing portion 18 and welded to the inside surface thereof, as at 24. Said rear housing portion 18 has an aperture 20 formed in the rear wall thereof having a diameter larger than the inside diameter of said spring 14 so that the shank of an externally threaded fastener can extend therethrough. The front portion 19 of said housing 16 is radially enlarged in respect to said rear portion 18 to free a length of said spring 14 at the front end thereof for threadably engaging an externally threaded fastener of the same hand as that of the helix of said spring 14. In the instance, said front housing portion 19 has a window 27 therein for purposes which will appear; said front portion 19 terminates in a radially enlarged flat planar flange 22 for bearing against a surface of material to be fastened.

The free front end of said spring 14 is designated 15 and the captured rear end thereof 11; both said ends are closed and ground. As is well known in the art, a spring that has a closed and ground end has its end coil pushed inwardly out of the normal helix position and ground to form a flat planar end surface thereon. While it is desirable that the rear end 11 be closed and ground to bear flat against the rear wall of the housing 16, it is essential tht the front spring end 15 be closed and ground to effect the hereinafter described desirable locking action of said lock fastener 12. For most applications the lock fastener 12 can be finger tightened to effect the hereinafter described desirable locking action thereof. For some applications, as where it is necessary to draw the materials to be fastened tightly together, it may be desirable to apply a wrench to the lock fastener 12 to further tighten it; for this purpose the front housing portion 19 can be formed with hexagonal flats as shown. In the instance shown in FIGS. 7 and 8, said lock fastener 12 is threaded on an externally and right hand threaded bolt 21, the threads of which are indicated at 23. The wire diameter of the spring 14 and the pitch of the bolt 21 need only be close to each other in size, not identical; the pitch of the spring 14 does not need to be as close to that of the bolt 21 as does the wire size. The closed and ground front spring end 15 leads the turns of the free front end thereof into extremely tight threaded engagement with the bolt 21; FIG. 8 illustrates the relationship of said ground and closed free end 15 with said threads 23. The engagement between the bolt 21 and the front end of the spring 14 forms a lock joint which is surprisingly extraordinarily tenacious and for all practical purposes substantially permanent insofar as backing off of the lock fastener 12 from the bolt 21. This superior locking action of said fastener 12 can surprisingly be achieved with simple hand tightening which is a peculiar and most valuable characteristic of my lock fastener; hand tightening as used herein is meant to include simple hand threading without tools whether materials are to be actually fastened or not.

In the instance, the lock fastener 12 and bolt 21 are shown in FIGS. 7 and 8 fastening two sheets of material 25 and 26 together. The front face of the flange 22 bears against the exposed face of the sheet material 25 and assists in fastening the materials 25 and 26 together. The lock joint between the lock fastener 12 and the bolt 21 is so tenacious that backing the lock fastener 12 off of the bolt 21 (i.e. rotating it oppositely as it was applied) will not, of itself, remove the former from the latter. To accomplish such removal, the closed and ground front spring end 15 must be picked up off the bolt 21, as with a pointed or blade tool, during backing off of the lock fastener 12 from the bolt 21. The window 27 is thus provided immediately adjacent said end 15 to enable the sharp end of such tool to be inserted into the interior of the housing 16 so as to reach said end 15 and lift it up off the bolt 21 during unthreading of the lock fastener 12. The lock fastener 12 shown in the drawings can be considered a two-way fastener, i.e. after being applied it remains locked in place, but can be removed as described. The lock fastener 12 can be modified by eliminating the window 27 in which case it can be considered a one-way fastener, i.e. after being applied, it cannot be removed ordinarily.

It will thus be seen that there has been provided by my invention a lock fastener in which the object hereinabove set forth, together with many thoroughly practical advantages, has been successfully achieved. For example, the lock fastener 12 can be relied upon to stay tightly fastened in place and will not loosen for any reason and can withstand any amount of vibration and does not require any lock washers or other elements; all of the foregoing advantages can be fully realized upon simple hand tightening. While a preferred embodiment of my invention has been shown and described, it is to be understood that variations and changes may be resorted to without departing from the spirit of my invention as defined by the appended claims. For example, it may be desirable, particularly when the window 27 is eliminated and the lock fastener is used as a one-way fastener, as explained, to eliminate the hexagonal flats on the front housing portion 19 and to make the same cylindrical like the rear portion 18 to discourage attempt at removal of said lock fastener. Said housing 16 can be made of metal as shown in the drawings or it can be made of plastic, in which case the rear end of said spring 14 can be embedded in the plastic during injection molding thereof.

What I claim is:

1. Improvement in a lock nut requiring a special removal procedure, said lock nut comprising a length of compression spring and a housing, the rear portion of said spring being disposed within said housing and being permanently fastened thereto, the front portion of said spring being unattached to and both disconnected and spaced from said housing and being freely movable for threadably engaging a bolt or the like of the same hand as the helix of said spring, the front end of said spring being closed out of the normal helix position and ground to form a flat planar end surface thereon so that, upon rotation of said lock nut, the front end of said spring will threadably engage and lock upon said bolt and so that, save for said special removal procedure, said lock nut cannot be unthreaded from said bolt, said special removal procedure consisting of lifting said ground and closed end off the bolt during unthreading of said lock nut.

2. Improvement in a lock nut as claimed in claim 1, said housing having a window formed in a wall thereof immediately adjacent said closed and ground front spring end for lifting the latter off said bolt during removal of said lock nut from said bolt.

3. Improvement in a lock nut as claimed in claim 1, said housing having a cylindrical rear portion, the turns on the rear portion of said spring being permanently fastened to said housing cylindrical rear portion.

4. Improvement in a lock nut as claimed in claim 1, the rear wall of said housing being flat and the rear end of said spring being closed and ground to bear flat against the rear wall of said housing.

5. Improvement in a lock nut as claimed in claim 1, the rear wall of said housing having an aperture therein having a diameter larger than the inside diameter of said spring.

6. Improvement in a lock nut as claimed in claim 1, the housing having a front portion which terminates in a radially enlarged flat planar flange for bearing against a surface of material to be fastened by said lock nut.

7. Improvement in a lock nut as claimed in claim 3, said housing having a front portion formed with hexagonal flats.

8. Improvement in method of making a lock nut requiring a special removal procedure, said method comprising providing a length of compression spring and housing therefor, disposing the rear portion of said spring within said housing and permanently fastening the same thereto, maintaining the front portion of said spring unattached to and both disconnected and spaced from said housing and freely movable for threaded engagement with a bolt or the like of the same hand as the helix of said spring, the front end of said spring being closed out of the normal helix position and ground to define a flat planar end surface thereon so that, upon rotation of said lock nut, the front end of said spring will threadably engage and lock upon said bolt and so that, save for said special removal procedure, said lock nut cannot be unthreaded from said bolt, said special removal procedure consisting of lifting said ground and closed end off the bolt during unthreading of said lock nut.

9. Improvement in method of making a lock nut as claimed in claim 8, forming a window in said housing immediately adjacent said closed and ground front spring end for lifting the latter off said bolt during removal of said lock nut from said bolt.

10. Improvement in method of making a lock nut as claimed in claim 8, forming the rear portion on said housing so that it is cylindrical, and permanently fastening the turns on the rear portion of said spring to said housing cylindrical rear portion.

11. Improvement in method of making a lock nut as claimed in claim 8, flattening the rear wall of said housing, the rear end of said spring being closed and ground so that it bears flat against the rear wall of said housing.

12. Improvement in method of making a lock nut as claimed in claim 8, providing an aperture in the rear wall of said housing having a diameter larger than the inside diameter of said spring.

13. Improvement in method of making a lock nut as claimed in claim 8, providing the housing with a front portion which terminates in a radially enlarged flat planar flange for bearing against a surface of material to be fastened by said lock nut.

14. Improvement in method of making a lock nut as claimed in claim 10, forming the front portion of said housing with hexagonal flats.

* * * * *